Patented Apr. 29, 1952

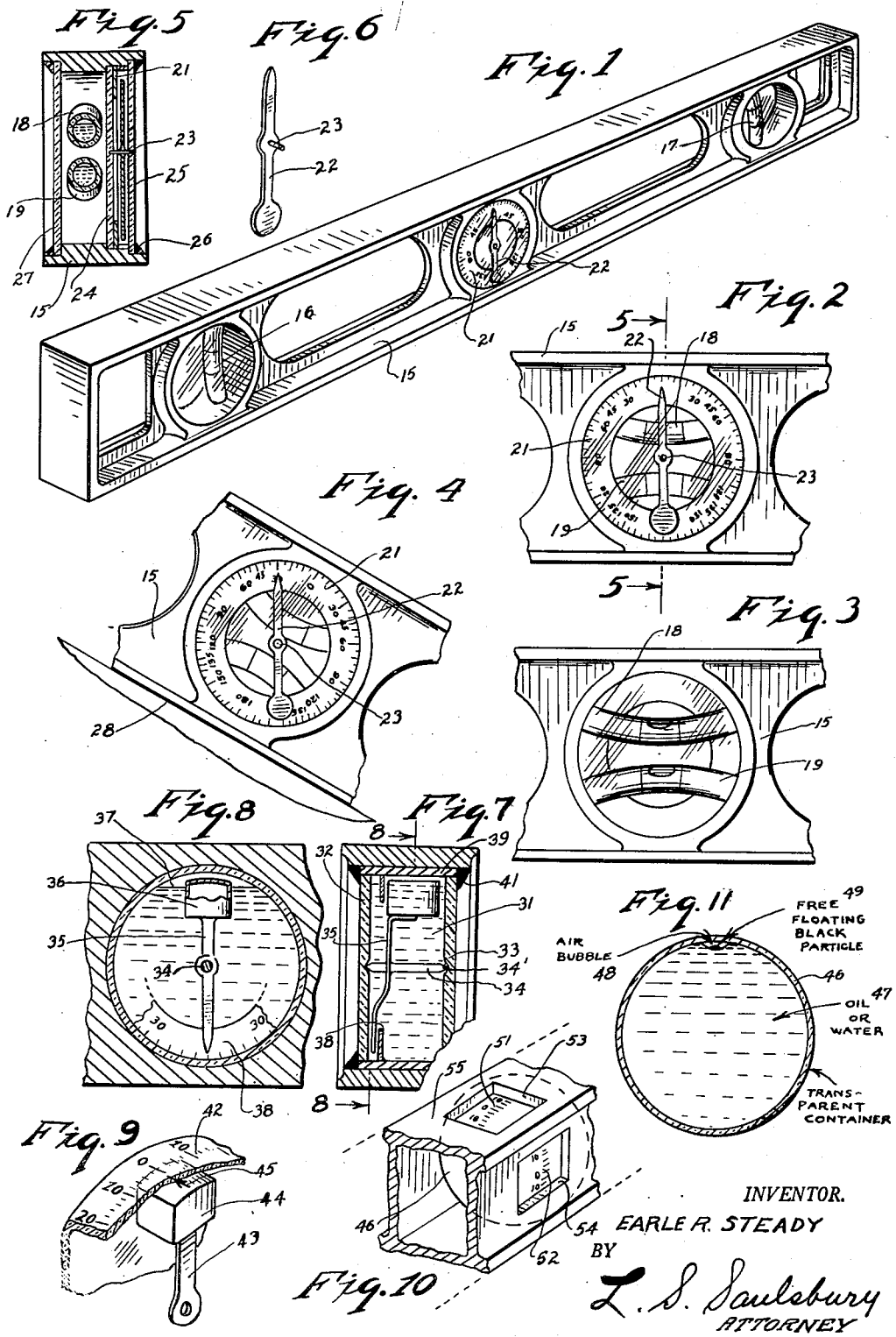

2,595,109

UNITED STATES PATENT OFFICE 2,595,109

PITCH FINDER FOR LEVELS

Earle R. Steady, Laconia, N. H.

Application February 9, 1950, Serial No. 143,215

1 Claim. (Cl. 33—206)

This invention relates to a pitch finder for a carpenter's level.

It is an object of the present invention to provide a pitch finder for a carpenter's level whereby as the level is applied to a surface, the pitch or angle of inclination can be determined at a glance, the needle or indicator automatically pointing to the degree of pitch.

Another object of the present invention is to provide a pitch finder for a carpenter's or plumber's level which is of simple construction, inexpensive to manufacture, has a minimum number of parts, consumes little space, protected from rupture, sturdy and compact, gives a true reading, convenient to use and efficient in operation.

For other objects and for a better understanding of the invention, reference may be had to the following detailed description taken in connection with the accompanying drawing, in which:

Fig. 1 is a perspective view of a level having the pitch finder of the present invention.

Fig. 2 is a fragmentary elevational view looking upon the pitch finder and upon the indicating dial thereof.

Fig. 3 is a perspective view looking upon the rear of the level and upon the bubble level indicators.

Fig. 4 is a fragmentary elevational view of the level supported upon an inclined surface and with an angle reading being taken with the pitch finder.

Fig. 5 is a transverse sectional view of the level taken on line 5—5 of Fig. 2.

Fig. 6 is a perspective view of the indicating needle.

Fig. 7 is a fragmentary sectional view of a modified form of the invention.

Fig. 8 is a sectional view of the modified form of the invention shown in Fig. 7 taken generally on line 8—8 of Fig. 7.

Fig. 9 is a fragmentary perspective view of the form of the invention shown in Fig. 7 showing the adjustment of the float relative to a top indication.

Fig. 10 is a fragmentary view of a still further form of the invention whereby angle indications can be taken from two different directions.

Fig. 11 is a sectional view of a ball filled with oil or water and having a free floating black particle therein, the ball being used in the form of the invention shown in Fig. 10.

Referring now particularly to Figs. 1 to 6, 15 represents a metal carpenter's or plumber's level comprising a rectangularly-shaped beam having the usual bubble gauges 16 and 17 at opposite ends of the level and central bubble gauges 18 and 19. In front of these gauges 18 and 19, there is disposed a disc 21 having angle indications thereon and a weighted pointer 22 pivotally connected by a pivot pin 23 between glass plates 24 and 25. The glass plate 25 is held in place by solder material 26. On the opposite side of the level there is secured a glass plate 27 to close off and protect the bubble tubes 18 and 19 at the rear of the level.

If the level 15 is placed on an inclined surface 28, an angle reading can be taken with the pointer 22. Accordingly, there has been provided an instrument or tool which will tell at a glance the pitch of the slope or inclined surface being measured. Before attaching the pitch finder to the level, an exact centering mark of the center level indicator is scribed on both side edges of the level to insure that the pitch finder will be properly located. The needle automatically points to the degree of pitch when the level is placed upon the inclined surface.

Referring now particularly to Figs. 7 and 8, there is shown a modified form of the invention wherein a liquid chamber 31 is provided between two parallel glass plates 32 and 33. In the center of these glass plates a pin 34 is mounted and is retained in position by having its ends enter suitable indentations or depressions 34' in said plates as clearly shown in Fig. 7. Said pin 34 is provided with an indicator or pointer 35 mounted thereon. On one end of the indicator is a hollow float 36. The chamber 31 is partially filled with liquid and the float will remain adjacent the top of the same. When the liquid is inclined at its surface, as indicated at 37, the float will move to correspond to its degree of inclination and will be indicated on a graduated ring 38 by the lower end of the pointer 35. The ring 38 is disposed within the chamber and spaced from the glass plate 32 a slight distance. The pointer is bent so that its indicating end extends between the ring 38 and the plate 32. The plates 32 and 33 are held in place against an annular band or sleeve 39 which spaces the plates 32 and 33 and which forms a wall of the liquid chamber 31, by sealing material 41.

Referring now to Fig. 9, there is shown a variation of the form of the invention shown in Figs. 7 and 8. The indications of degrees are provided on the periphery of a closed transparent casing 42. An arm 43 is pivoted between the sides of the casing 42 in the same manner as shown in Fig. 7 and by means of a pin and this arm carries a hollow float 44 having an indicating mark 45 thereon. The operation of measuring the angle of the inclined surface is effected in the same manner as with the other forms of the invention. The casing 42 fits within an opening in the level.

In Figs. 10 and 11, there is shown a still further form of the invention wherein the casing is, as indicated at 46, in the shape of a transparent ball which contains oil or water 47. In this ball is an air bubble which contains a free floating black particle 49. This ball is provided with angled indications 51 and 52 in different planes and visible through openings 53 and 54 respectively in a gauge 55. This gauge 55 has straight side surfaces which can be rested upon the inclined surface or slope to be measured. The black particle will move in the proper plane to give the angle indication of the slope.

While various changes may be made in the detail construction, it shall be understood that such changes shall be within the spirit and scope of the present invention as defined by the appended claim.

I claim:

In a carpenter's level, a rectangularly-shaped beam provided with an opening extending transversely therethrough substantially centrally thereof and a pitch finder comprising a liquid-containing chamber interfitting with the opening in said beam and consisting of an annular band and spaced front and rear glass walls mounted within and secured to said band adjacent its edges, sealing means on the front and rear glass walls and engaging with the opening wall to hold the chamber therewithin, said glass walls being provided with aligning depressions substantially centrally thereof, a degree graduated scale mounted in the lower portion of said chamber and spaced from said front glass wall, a pin having its ends supported within said depressions in said front and rear walls and a pointer carried by said pin and having its upper end carrying a float adapted to follow the surface of the liquid in the chamber and its lower end having an indicator movable between said front glass wall and said scale and adapted to cooperate with said scale to apprise the user of the degree of inclination of the level, said float lying between the scale and the rear plate to be guided thereby.

EARLE R. STEADY.

REFERENCES CITED

The following references are of record in the file of this patent:

UNITED STATES PATENTS

| Number | Name | Date |
| --- | --- | --- |
| 7,263 | Ladd | Apr. 9, 1850 |
| 933,912 | Malter | Sept. 14, 1909 |
| 1,162,018 | Bevacqua | Nov. 30, 1915 |
| 1,261,862 | Spangler | Apr. 9, 1918 |
| 1,277,102 | Miller | Aug. 27, 1918 |
| 1,277,748 | Owen | Sept. 3, 1918 |
| 1,373,336 | Knapp | Mar. 29, 1921 |
| 1,376,727 | Pentz | May 3, 1921 |
| 1,602,276 | Lutz | Oct. 5, 1926 |
| 1,836,079 | McBride | Dec. 15, 1931 |
| 1,855,664 | Budge | Apr. 26, 1932 |